(12) United States Patent
Oglesby

(10) Patent No.: US 11,129,471 B1
(45) Date of Patent: Sep. 28, 2021

(54) MOBILE COMPUTER WORKSTATION

(71) Applicant: Walter Oglesby, Catonsville, MD (US)

(72) Inventor: Walter Oglesby, Catonsville, MD (US)

( * ) Notice: Subject to any disclaimer, the term of this patent is extended or adjusted under 35 U.S.C. 154(b) by 0 days.

(21) Appl. No.: 16/741,893

(22) Filed: Jan. 14, 2020

(51) Int. Cl.
A47B 21/04 (2006.01)
A47B 9/20 (2006.01)
A47B 13/08 (2006.01)
A47B 21/02 (2006.01)
B62B 3/02 (2006.01)
B62B 3/04 (2006.01)
A47B 13/02 (2006.01)

(52) U.S. Cl.
CPC .......... A47B 21/04 (2013.01); A47B 9/20 (2013.01); A47B 13/023 (2013.01); A47B 13/081 (2013.01); A47B 21/02 (2013.01); B62B 3/02 (2013.01); B62B 3/04 (2013.01); A47B 2013/024 (2013.01)

(58) Field of Classification Search
CPC ............ A47B 21/00; A47B 2200/0066; F16M 11/043; F16M 11/045; F16M 11/06; F16M 11/08; F16M 11/12
USPC .......................................... 108/50.01, 50.02
See application file for complete search history.

(56) References Cited

U.S. PATENT DOCUMENTS

| | | | | |
|---|---|---|---|---|
| 5,638,758 A * | 6/1997 | Carr | ........................ | A47B 21/06 108/150 |
| 5,806,943 A * | 9/1998 | Dell | ........................ | A47B 21/00 108/147 |
| 6,397,761 B1 * | 6/2002 | Moore | ........................ | A47B 9/10 108/147 |
| D459,610 S | 7/2002 | Coonan | | |
| 6,493,220 B1 * | 12/2002 | Clark | ........................ | A47B 21/00 361/679.41 |
| 6,712,008 B1 * | 3/2004 | Habenicht | .......... | A47B 21/0314 108/147 |
| 7,506,592 B2 * | 3/2009 | Rossini | .............. | A47B 21/0314 108/147 |
| 7,828,253 B2 * | 11/2010 | Meyer | .................... | A47B 21/00 248/129 |
| 8,342,462 B2 | 1/2013 | Sapper | | |

(Continued)

FOREIGN PATENT DOCUMENTS

| | | | | |
|---|---|---|---|---|
| CA | 2253978 A1 * | 5/2000 | ............. | F16M 11/42 |
| CA | 2813386 A1 * | 2/2012 | ............. | F16M 11/00 |

(Continued)

Primary Examiner — Jose V Chen

(57) ABSTRACT

The mobile computer workstation is a cart. The mobile computer workstation is configured for use with a computer. The mobile computer workstation forms a mobile station on which the computer is placed. The mobile computer workstation allows the computer readily moved between locations without requiring the disassembly and assembly of the various components of the computer. The elevation of the superior surface of the mobile computer workstation is adjustable such that the computer can be used while standing or sitting. The mobile computer workstation comprises a pedestal, a telescopic master stanchion, and a pivoting desk. The telescopic master stanchion attaches the pedestal to the pivoting desk. The pivoting desk forms the working horizontal surface of the mobile computer workstation. The pedestal: a) is a rolling structure used to move the computer; and, b) stores the elements of the computer not associated with interface functions with a user.

15 Claims, 5 Drawing Sheets

(56) References Cited

U.S. PATENT DOCUMENTS

| | | | |
|---|---|---|---|
| 8,485,111 B2* | 7/2013 | Chinuki | A47B 13/10 |
| | | | 108/50.01 |
| 8,702,049 B2 | 4/2014 | Vieira | |
| 8,726,814 B1* | 5/2014 | Matteo | A47B 9/16 |
| | | | 108/50.02 |
| 8,789,474 B2* | 7/2014 | Kim | A47B 41/02 |
| | | | 108/10 |
| 8,826,831 B2* | 9/2014 | Hazzard | A47B 21/0314 |
| | | | 108/50.01 |
| 9,477,322 B2 | 10/2016 | Noris | |
| 9,549,609 B2 | 1/2017 | Constantino | |
| 9,797,544 B1* | 10/2017 | Smed | F16M 11/2085 |
| 9,973,736 B2 | 5/2018 | Roberts | |
| 2004/0094072 A1* | 5/2004 | Fabian | F16M 11/10 |
| | | | 108/50.01 |
| 2004/0211343 A1* | 10/2004 | Song | A47B 21/00 |
| | | | 108/50.01 |
| 2005/0022699 A1* | 2/2005 | Goza | A47B 21/0314 |
| | | | 108/50.01 |
| 2005/0230585 A1* | 10/2005 | Hung | F16M 13/02 |
| | | | 248/278.1 |
| 2006/0054751 A1 | 3/2006 | Johnson | |
| 2007/0001413 A1* | 1/2007 | Rossini | A47B 21/00 |
| | | | 280/47.35 |
| 2007/0227409 A1* | 10/2007 | Chu | A47B 21/00 |
| | | | 108/50.02 |
| 2010/0019548 A1* | 1/2010 | Tajbakhsh | A47B 21/00 |
| | | | 297/162 |
| 2010/0213679 A1* | 8/2010 | Smith | B62B 3/10 |
| | | | 280/47.35 |
| 2012/0031310 A1* | 2/2012 | Jedrysik | A47B 21/0314 |
| | | | 108/50.01 |
| 2015/0208799 A1* | 7/2015 | Ergun | A47B 21/04 |
| | | | 108/42 |
| 2017/0191607 A1* | 7/2017 | Huang | F16M 11/10 |
| 2019/0343272 A1* | 11/2019 | Smith | F16M 11/24 |
| 2020/0170407 A1* | 6/2020 | Knapp | A47B 9/20 |

FOREIGN PATENT DOCUMENTS

| | | | |
|---|---|---|---|
| CA | 2826959 | 3/2014 | |
| DE | 202017107086 U1 * | 11/2017 | F16M 11/2014 |
| FR | 2867664 A1 * | 9/2005 | A47B 21/00 |
| WO | WO-2013165562 A1 * | 11/2013 | F16M 11/2014 |

* cited by examiner

MOBILE COMPUTER WORKSTATION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanical engineering and engineering elements, more specifically, a support for positioning articles. (F16M13/02)

SUMMARY OF INVENTION

The mobile computer workstation is a cart. The mobile computer workstation is configured for use with a computer. The mobile computer workstation forms a mobile station on which the computer is placed. The mobile computer workstation allows the computer readily moved between locations without requiring the disassembly and assembly of the various components of the computer. The elevation of the superior surface of the mobile computer workstation is adjustable such that the computer can be used while standing or sitting. The mobile computer workstation comprises a pedestal, a telescopic master stanchion, and a pivoting desk. The telescopic master stanchion attaches the pedestal to the pivoting desk. The pivoting desk forms the working horizontal surface of the mobile computer workstation. The pedestal: a) is a rolling structure used to move the computer; and, b) stores the elements of the computer not associated with interface functions with a user.

These together with additional objects, features and advantages of the mobile computer workstation will be readily apparent to those of ordinary skill in the art upon reading the following detailed description of the presently preferred, but nonetheless illustrative, embodiments when taken in conjunction with the accompanying drawings.

In this respect, before explaining the current embodiments of the mobile computer workstation in detail, it is to be understood that the mobile computer workstation is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mobile computer workstation.

It is therefore important that the claims be regarded as including such equivalent construction insofar as they do not depart from the spirit and scope of the mobile computer workstation. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
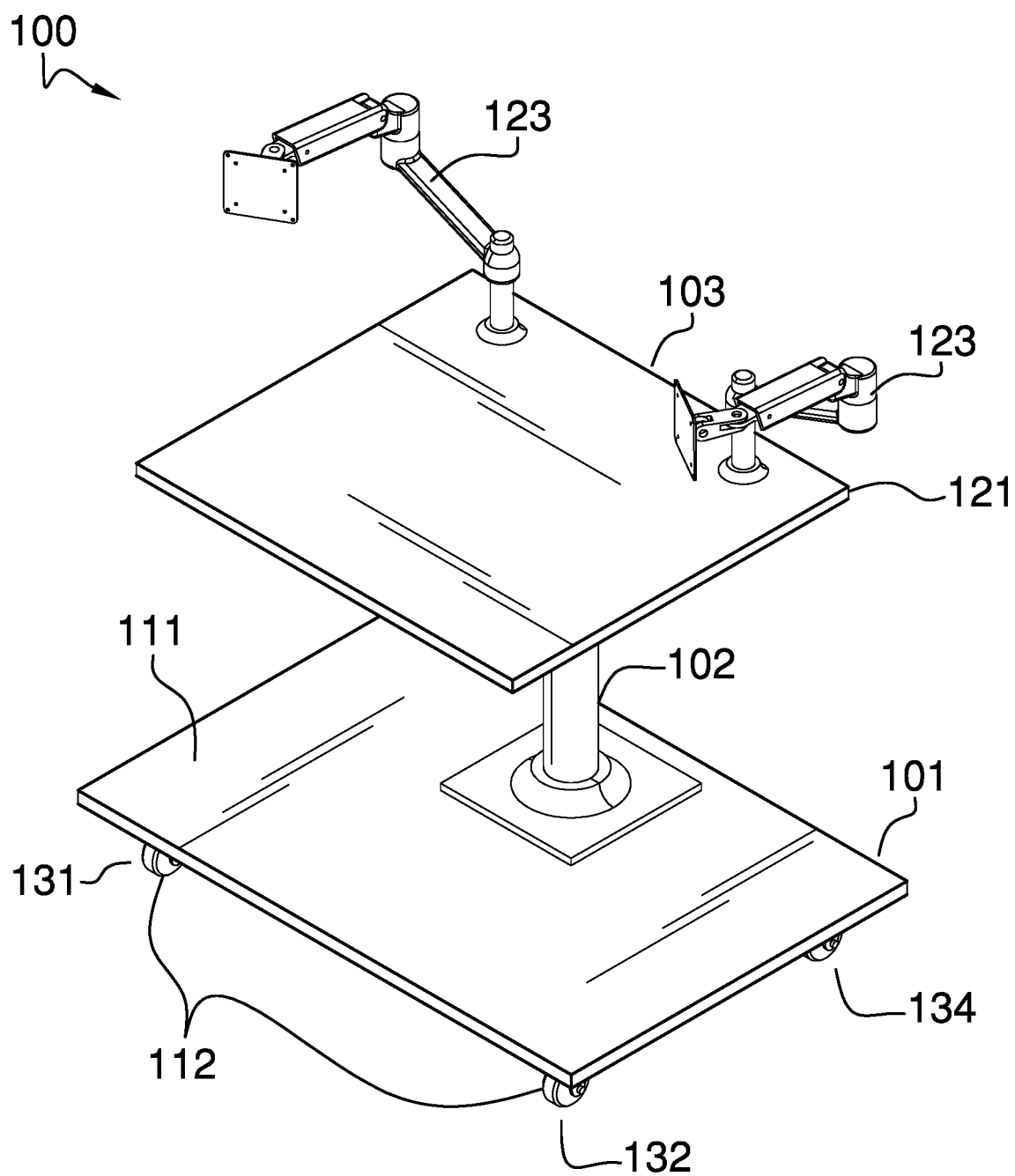
FIG. 1 is a perspective view of an embodiment of the disclosure.
Figure 2:
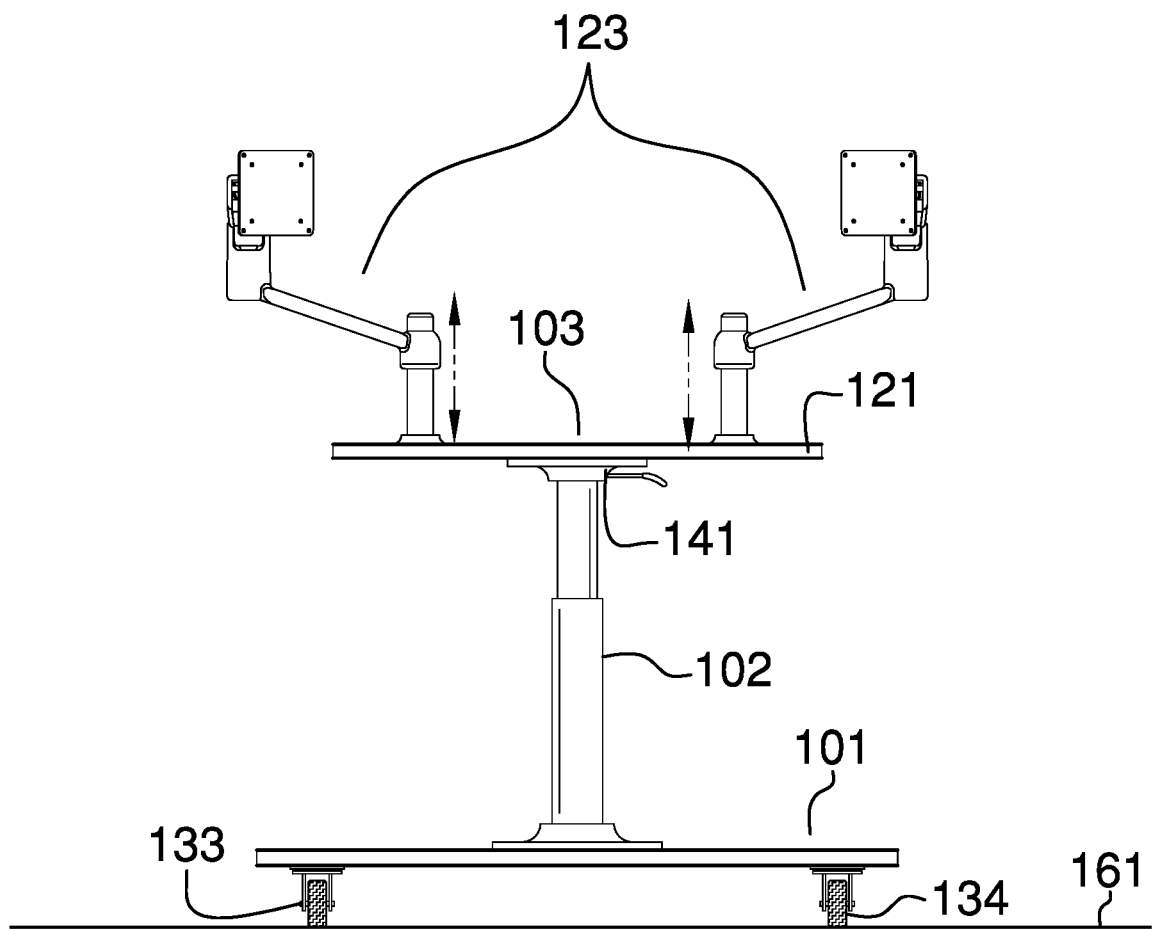
FIG. 2 is a front view of an embodiment of the disclosure.
Figure 3:
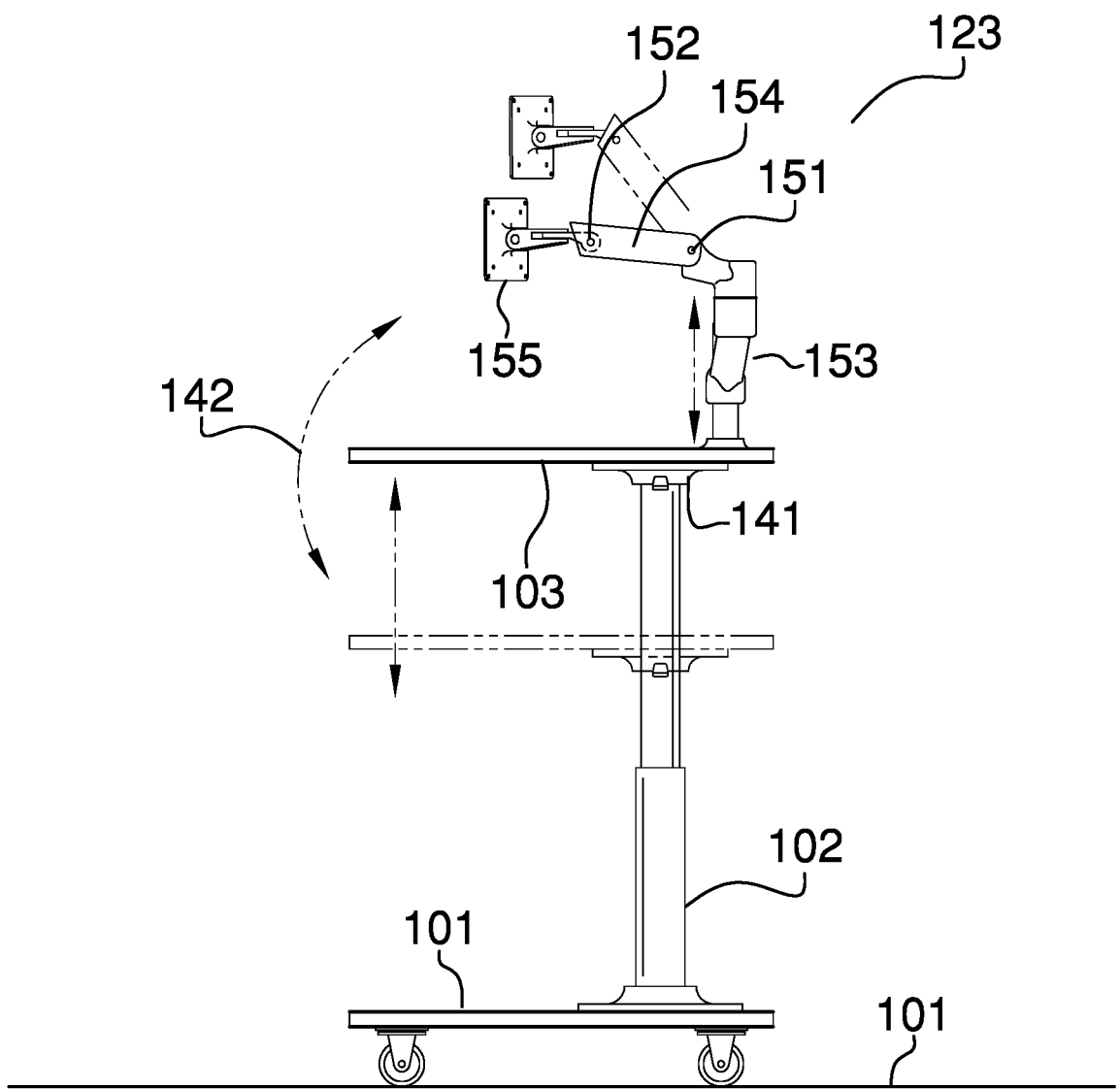
FIG. 3 is a side view of an embodiment of the disclosure.
Figure 4:
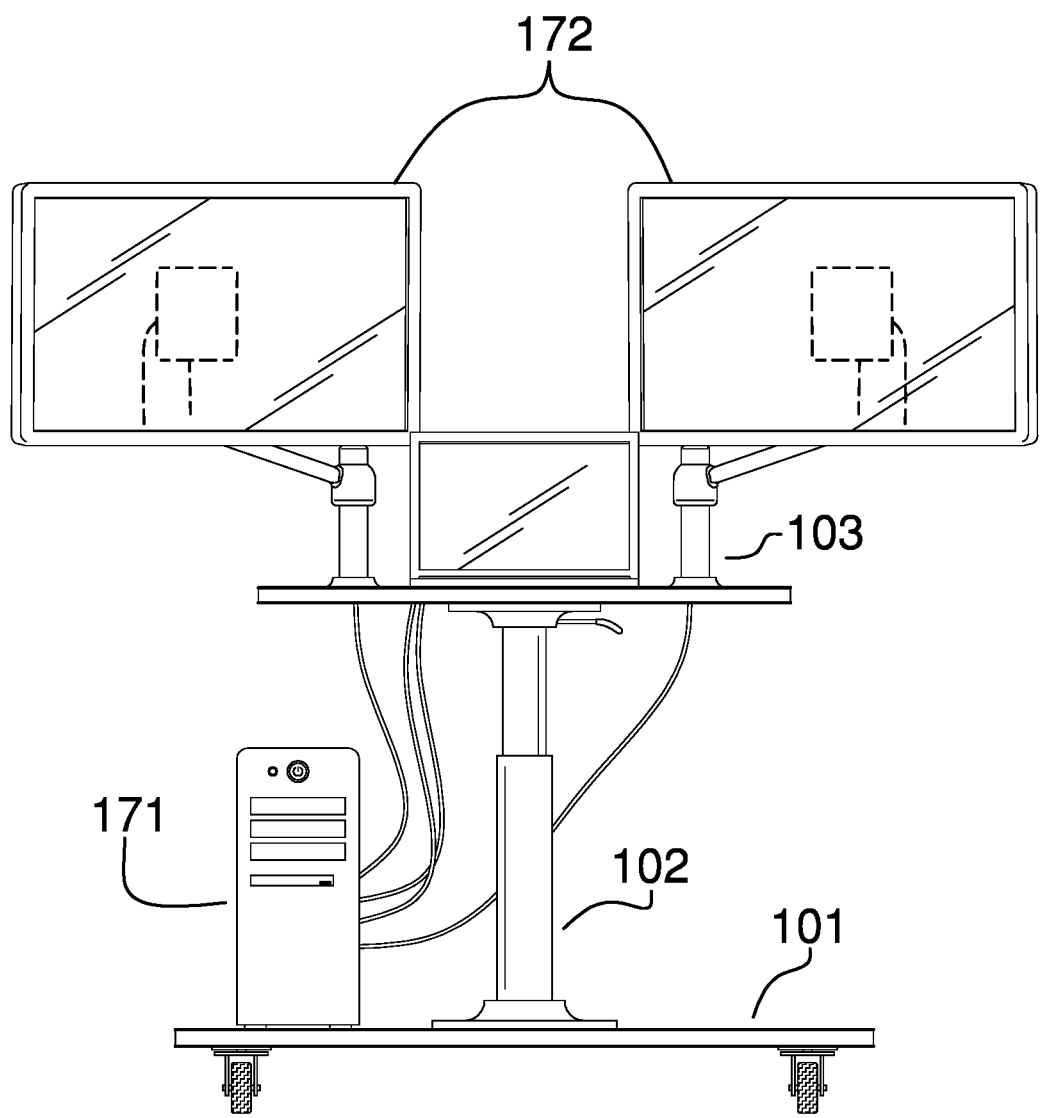
FIG. 4 is an in-use view of an embodiment of the disclosure.
Figure 5:
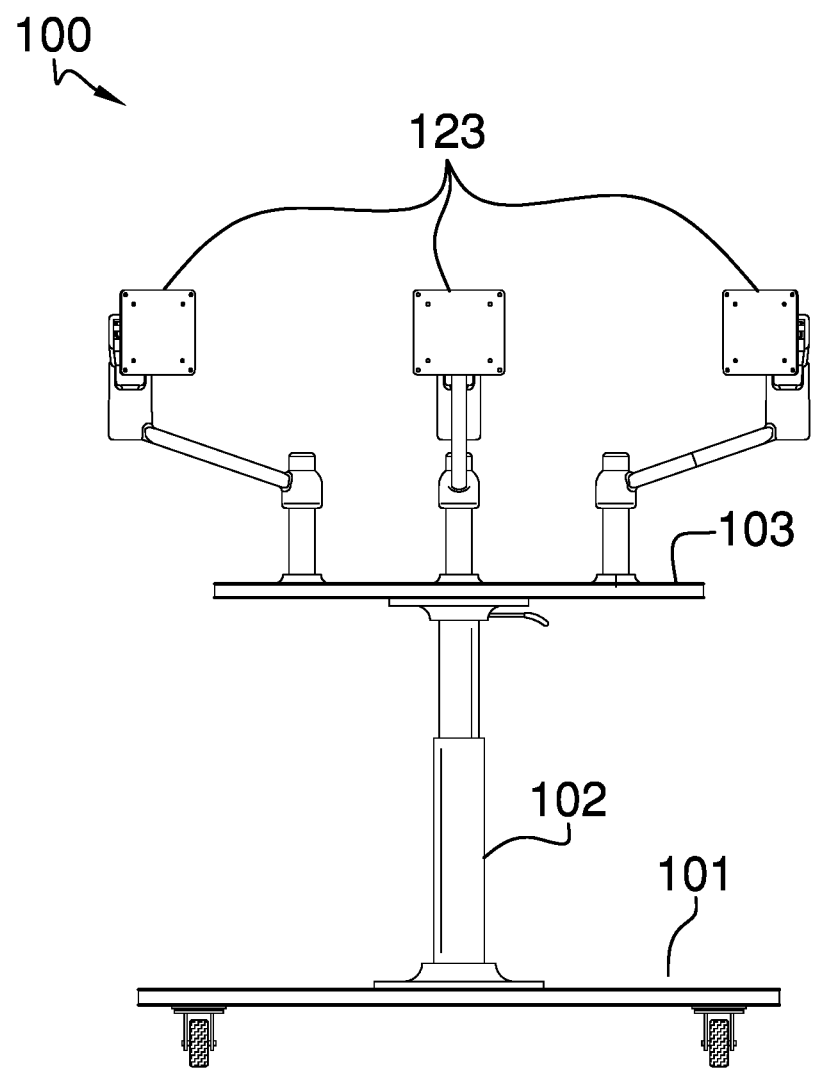
FIG. 5 is a front view of an alternate embodiment of the disclosure.

Detailed reference will now be made to one or more potential embodiments of the disclosure, which are illustrated in FIGS. 1 through 5.

The mobile computer workstation 100 (hereinafter invention) is a cart. The invention 100 is configured for use with a computer 171. The invention 100 forms a mobile station on which the computer 171 is placed. The invention 100 allows the computer 171 readily moved between locations without requiring the disassembly and assembly of the various components of the computer 171. The elevation of the superior surface of the invention 100 is adjustable such that the computer 171 can be used while standing or sitting. The invention 100 comprises a pedestal 101, a telescopic master stanchion 102, and a pivoting desk 103. The telescopic master stanchion 102 attaches the pedestal 101 to the pivoting desk 103. The pivoting desk 103 forms the working horizontal surface of the invention 100. The pedestal 101: a) is a rolling structure used to move the computer 171 over a supporting surface 161; and, b) stores the elements of the computer 171 not associated with interface functions with a user.

The pedestal 101 is the inferior structure of the invention 100. The pedestal 101 forms the final link of the load path that transfers the load of the invention 100 to the supporting surface 161. The pedestal 101 rolls over the supporting surface 161. The pedestal 101 forms a supporting structure that raises a computer 171 and one or more display devices 172 above the supporting surface 161. The pedestal 101 transports the computer 171 and the one or more display devices 172 over the supporting surface 161 without requiring the disassembly of the one or more display devices 172 from the computer 171. The pedestal 101 comprises an inferior counter 111 and a plurality of wheels 112.

The inferior counter 111 is a disk-shaped structure. The inferior counter 111 is a plate structure that attaches to the inferior end of the telescopic master stanchion 102. The inferior counter 111 forms a load bearing structure used for elevating a load above the supporting surface 161.

Each of the plurality of wheels 112 is a rotating structure that attaches to the inferior congruent end of the disk structure of the inferior counter 111. Each of the plurality of wheels 112 is selected from the group consisting of a wheel and a caster. Each of the plurality of wheels 112 elevates the inferior counter 111 above the supporting surface 161. The plurality of wheels 112 elevate the inferior counter 111 such that the congruent ends of the disk structure of the inferior counter 111 are parallel to a planar supporting surface 161. Each of the plurality of wheels 112 allows the invention 100 to roll over the supporting surface 161. The plurality of wheels 112 comprises a first caster 131, a second caster 132, a third caster 133, and a fourth caster 134.

The first caster 131 is a locking caster selected from the plurality of wheels 112. The second caster 132 is a locking caster selected from the plurality of wheels 112. The second caster 132 is identical to the first caster 131. The third caster 133 is a locking caster selected from the plurality of wheels 112. The third caster 133 is identical to the second caster 132. The fourth caster 134 is a locking caster selected from the plurality of wheels 112. The fourth caster 134 is identical to the third caster 133.

The telescopic master stanchion 102 is an extension apparatus. The telescopic master stanchion 102 has a composite prism structure. The span of the length of the center axis of the composite prism structure of the telescopic master stanchion 102 is adjustable. The telescopic master stanchion 102 attaches the pedestal 101 to the pivoting desk 103. The telescopic master stanchion 102 elevates the pivoting desk 103 above the supporting surface 161. The telescopic master stanchion 102 adjusts the elevation of the pivoting desk 103 above the supporting surface 161 by adjusting the span of the distance between the pivoting desk 103 and the pedestal 101.

The pivoting desk 103 forms the superior structure of the invention 100. The pivoting desk 103 forms a cant 142 relative to the force of gravity. The pivoting desk 103 forms a counter that provides a workspace for the user. The pivoting desk 103 is a rotating structure such that the cant 142 formed between the working surface formed by the pivoting desk 103 and the force of gravity is adjustable. The pivoting desk 103 comprises a superior counter 121 and one or more display mounts 122.

The superior counter 121 is a disk-shaped structure. The superior counter 121 is a plate structure that attaches to the superior end of the telescopic master stanchion 102. The superior surface of the superior counter 121 forms the primary working surface of the invention 100. The superior counter 121 forms a cant 142. The cant 142 is defined as the angle between the superior surface of the superior counter 121 and the force of gravity. The superior counter 121 further comprises a pivoting mount 141.

The pivoting mount 141 is a fastening structure. The pivoting mount 141 is a rotating structure. The pivoting mount 141 is a locking structure. The pivoting mount 141 attaches the inferior surface of the superior counter 121 to the superior congruent end of the composite prism structure of the telescopic master stanchion 102. The pivoting mount 141 attaches the superior counter 121 to the telescopic master stanchion 102 such that the pivoting mount 141 rotates relative to the force of gravity.

Each of the one or more display mounts 122 is a mechanical structure. Each of the one or more display mounts 122 attaches to the superior congruent end of the disk structure of the superior counter 121. The superior congruent end of the superior counter 121 is also referred to as the superior surface of the superior counter 121. Each display device selected from the one or more display devices 172 of the computer 171 attaches to an individual display mount 123 selected from the one or more display mounts 122. The one or more display mounts 122 is formed from a collection of individual display mounts 123. Each individual display mount 123 is identical.

Each individual display mount 123 selected from the one or more display mounts 122 is an extension apparatus that extends the reach between the superior surface of the superior counter 121 and the selected display device attached to the selected individual display mount 123.

Each individual display mount 123 is a mechanical apparatus. The individual display mount 123 is a rotating and telescopic structure. A display device selected from the one or more display devices 172 attaches to the individual display mount 123. The telescopic nature of the individual display mount 123 adjusts the reach between the superior surface of the superior counter 121 and the display device selected from the one or more display devices 172 attached to the individual display mount 123. The rotating nature of the individual display mount 123 adjusts the position of the selected display device attached to the individual display mount 123 relative to the superior surface of the superior counter 121.

Each individual display mount 123 comprises a first universal joint 151, a second universal joint 152, a telescopic mount stanchion 153, a mounting jib 154, and a display mounting plate 155.

The telescopic mount stanchion 153 is a composite prism structure that attaches the mounting jib 154 to the superior surface of the superior counter 121. The telescopic mount stanchion 153 is a telescopic structure. The telescopic mount stanchion 153 is an extension apparatus that separates the mounting jib 154 from the superior counter 121. The span of the length of the center axis of the composite prism structure of the telescopic mount stanchion 153 is adjustable.

The reach between the mounting jib 154 and the superior counter 121 adjusts by adjusting the span of the length of the center axis of the composite prism structure of the telescopic mount stanchion 153. The mounting jib 154 is a prism-shaped structure. The mounting jib 154 attaches to the telescopic mount stanchion 153 in the manner of a cantilever. The mounting jib 154 attaches to the end of the telescopic mount stanchion 153 that is distal from the superior counter 121. The mounting jib 154 attaches to the telescopic mount stanchion 153 such that the free end of the mounting jib 154 rotates relative to the telescopic mount stanchion 153.

The first universal joint 151 is a locking universal joint. The universal joint is defined elsewhere in this disclosure. The first universal joint 151 attaches the fixed end of the cantilever structure of the mounting jib 154 to the end of the telescopic mount stanchion 153 that is distal from the superior counter 121. The first universal joint 151 attaches the mounting jib 154 to the telescopic mount stanchion 153 such that the mounting jib 154 rotates relative to the telescopic mount stanchion 153. The second universal joint 152 is a locking universal joint. The universal joint is defined elsewhere in this disclosure. The second universal joint 152 attaches the display mounting plate 155 to the free end of the mounting jib 154. The second universal joint 152 attaches the display mounting plate 155 to the mounting jib 154 such that the display mounting plate 155 rotates relative to the mounting jib 154.

The display mounting plate 155 is a mechanical device that attaches a display device selected from the one or more display devices 172 to the mounting jib 154. The supporting surface 161 is defined elsewhere in this disclosure. The computer 171 is defined elsewhere in this disclosure. The display is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Articulated: As used in this disclosure, articulated refers to two objects that are joined together using a hinge or a flexible joint such that the first object moves relative to the second object. A structure that contains an articulated subcomponent is referred to as an articulated structure.

Ball and Socket Joint: As used in this disclosure, a ball and socket joint means a manufactured joint, coupling, or fitting in which a partially spherical object lies in a socket, allowing for multidirectional movement and rotation within limits determined by the construction of the ball and socket joint. The ball and socket joint is a type of universal joint.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cart: As used in this disclosure, a cart is a small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Computer: As used in this disclosure, a computer is a programmable electrical device that processes externally provided inputs to generate outputs that are determined from a previously programmed set of instructions.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Counter: As used in this disclosure, a counter is a horizontal surface a working space for a project. A counter is further defined with an inferior surface and a superior surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Apparatus: As used in this disclosure, an extension apparatus is a mechanical structure that is used to extend or bridge the reach between any two objects.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hinge: As used in this disclosure, a hinge is a device that permits the turning, rotating, or pivoting of a first object relative to a second object. A hinge designed to be fixed into a set position after rotation is called a locking hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interface: As used in this disclosure, an interface is a physical or virtual boundary that separates two different systems across which information is exchanged.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Mount: As used in this disclosure, a mount is a mechanical structure that attaches or incorporates an object into a load path.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Platform: As used in this disclosure, a platform is a raised horizontal surface that forms a load path to support objects placed on the superior surface of the platform.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object. Include inferior superior and load path.

Swivel: As used in this disclosure, a swivel is a fastening structure that attaches a first object to a second object such that the first object will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

Universal Joint: As used in this disclosure, a universal joint is a method of joining a first shaft to as second shaft such that the center axis of the first shaft and is offset from the center axis of the second shaft. The offset angle is adjustable. When a universal joint is formed with a locking mechanism, a universal joint can further be used to lock the offset angle between the first shaft and the second shaft into a fixed position. Universal joints are often used to transfer rotation from the first shaft to rotate the second shaft.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A mobile computer workstation comprising
a pedestal, a telescopic master stanchion, and a pivoting desk;
wherein the telescopic master stanchion attaches the pedestal to the pivoting desk;
wherein the mobile computer workstation is a cart;
wherein the mobile computer workstation is configured for use with a computer;
wherein the computer further comprises one or more display devices;
wherein the mobile computer workstation forms a mobile station on which the computer is placed;
wherein the mobile computer workstation allows the computer readily moved between locations without requiring the disassembly and assembly the computer;
wherein the pedestal comprises an inferior counter and a plurality of wheels;
wherein each of the plurality of wheels is a rotating structure that attaches to an inferior congruent end of a disk structure of the inferior counter;
wherein the pivoting desk comprises a superior counter and one or more display mounts;
wherein the superior counter is a plate structure that attaches to a superior end of the telescopic master stanchion;
wherein each of the one or more display mounts is a mechanical structure;
wherein each of the one or more display mounts attaches to the superior congruent end of the disk structure of the superior counter;
wherein each display device selected from the one or more display devices of the computer attaches to an individual display mount selected from the one or more display mounts;
wherein the one or more display mounts are formed from a collection of individual display mounts;
wherein the elevation of the superior surface of the mobile computer workstation is adjustable;
wherein each individual display mount is identical;
wherein each individual display mount selected from the one or more display mounts is an extension apparatus that extends the reach between the superior congruent end of the superior counter and the selected display device attached to the selected individual display mount;
wherein each individual display mount is a mechanical apparatus;
wherein the individual display mount is a rotating and telescopic structure;
wherein a display device selected from the one or more display devices attaches to the individual display mount;
wherein the telescopic nature of the individual display mount adjusts the reach between the superior congruent end of the superior counter and the display device selected from the one or more display devices attached to the individual display mount;
wherein the rotating nature of the individual display mount adjusts the position of the selected display device attached to the individual display mount relative to the superior congruent end of the superior counter.

2. The mobile computer workstation according to claim 1 wherein the pivoting desk forms the working horizontal surface of the mobile computer workstation.

3. The mobile computer workstation according to claim 2 wherein the pedestal is the inferior structure of the mobile computer workstation;
wherein the pedestal: a) is a rolling structure used to move the computer over a supporting surface; and, b) stores the elements of the computer not associated with interface functions with a user;
wherein the pedestal forms the final link of the load path that transfers the load of the mobile computer workstation to the supporting surface;
wherein the pedestal rolls over the supporting surface.

4. The mobile computer workstation according to claim 3 wherein the pedestal forms a supporting structure that raises a computer and one or more display devices above the supporting surface;
wherein the pedestal transports the computer and the one or more display devices over the supporting surface without requiring the disassembly of the one or more display devices from the computer.

5. The mobile computer workstation according to claim 4 wherein the telescopic master stanchion is an extension apparatus;
wherein the telescopic master stanchion has a composite prism structure;
wherein the span of the length of the center axis of the composite prism structure of the telescopic master stanchion is adjustable.

6. The mobile computer workstation according to claim 5 wherein the telescopic master stanchion attaches the pedestal to the pivoting desk;
wherein the telescopic master stanchion elevates the pivoting desk above the supporting surface;
wherein the telescopic master stanchion adjusts the elevation of the pivoting desk above the supporting surface by adjusting the span of the distance between the pivoting desk and the pedestal.

7. The mobile computer workstation according to claim 6 wherein the pivoting desk forms the superior structure of the mobile computer workstation;
wherein the pivoting desk forms a cant relative to the force of gravity;
wherein the pivoting desk forms a counter that provides a workspace for the user;
wherein the pivoting desk is a rotating structure such that the cant formed between the working surface formed by the pivoting desk and the force of gravity is adjustable.

8. The mobile computer workstation according to claim 7 wherein the inferior counter is a plate structure that attaches to the inferior end of the telescopic master stanchion;
wherein the inferior counter forms a load bearing structure used for elevating a load above the supporting surface.

9. The mobile computer workstation according to claim 8 wherein each of the plurality of wheels is a rotating structure that attaches to the inferior congruent end of the disk structure of the inferior counter;
wherein each of the plurality of wheels is selected from the group consisting of a wheel and a caster;
wherein each of the plurality of wheels elevates the inferior counter above the supporting surface;

wherein the plurality of wheels elevate the inferior counter such that the congruent ends of the disk structure of the inferior counter are parallel to a planar supporting surface;

wherein each of the plurality of wheels allows the mobile computer workstation to roll over the supporting surface.

10. The mobile computer workstation according to claim 9 wherein the superior congruent end of the superior counter forms the primary working surface of the mobile computer workstation;

wherein the superior counter forms a cant;

wherein the cant is defined as the angle between the superior congruent end of the superior counter and the force of gravity.

11. The mobile computer workstation according to claim 10 wherein the superior counter further comprises a pivoting mount;

wherein the pivoting mount is a fastening structure;

wherein the pivoting mount is a rotating structure;

wherein the pivoting mount is a locking structure.

12. The mobile computer workstation according to claim 11 wherein the pivoting mount attaches the inferior surface of the superior counter to the superior congruent end of the composite prism structure of the telescopic master stanchion;

wherein the pivoting mount attaches the superior counter to the telescopic master stanchion such that the pivoting mount rotates relative to the force of gravity.

13. The mobile computer workstation according to claim 12 wherein each individual display mount comprises a first universal joint, a second universal joint, a telescopic mount stanchion, a mounting jib, and a display mounting plate;

wherein the telescopic mount stanchion is a composite prism structure that attaches the mounting jib to the superior congruent end of the superior counter;

wherein the telescopic mount stanchion is a telescopic structure;

wherein the telescopic mount stanchion is an extension apparatus that separates the mounting jib from the superior counter;

wherein the span of the length of the center axis of the composite prism structure of the telescopic mount stanchion is adjustable;

wherein the reach between the mounting jib and the superior counter adjusts by adjusting the span of the length of the center axis of the composite prism structure of the telescopic mount stanchion;

wherein the mounting jib is a prism-shaped structure;

wherein the mounting jib attaches to the telescopic mount stanchion in the manner of a cantilever;

wherein the mounting jib attaches to the end of the telescopic mount stanchion that is distal from the superior counter;

wherein the mounting jib attaches to the telescopic mount stanchion such that the free end of the mounting jib rotates relative to the telescopic mount stanchion;

wherein the first universal joint is a locking universal joint;

wherein the first universal joint attaches the fixed end of the cantilever structure of the mounting jib to the end of the telescopic mount stanchion that is distal from the superior counter;

wherein the first universal joint attaches the mounting jib to the telescopic mount stanchion such that the mounting jib rotates relative to the telescopic mount stanchion;

wherein the second universal joint is a locking universal joint;

wherein the second universal joint attaches the display mounting plate to the free end of the mounting jib;

wherein the second universal joint attaches the display mounting plate to the mounting jib such that the display mounting plate rotates relative to the mounting jib;

wherein the display mounting plate is a mechanical device that attaches a display device selected from the one or more display devices to the mounting jib.

14. The mobile computer workstation according to claim 13 wherein the plurality of wheels comprises a first caster, a second caster, a third caster, and a fourth caster;

wherein the first caster is a locking caster selected from the plurality of wheels;

wherein the second caster is a locking caster selected from the plurality of wheels;

wherein the third caster is a locking caster selected from the plurality of wheels;

wherein the fourth caster is a locking caster selected from the plurality of wheels.

15. The mobile computer workstation according to claim 14 wherein the second caster is identical to the first caster;

wherein the third caster is identical to the second caster;

wherein the fourth caster is identical to the third caster.

* * * * *